United States Patent Office 3,634,396
Patented Jan. 11, 1972

3,634,396
PROCESS FOR MAKING AZIRIDINES
Enrique G. Ramirez and Gordon R. Miller, Lake Jackson, Tex., assignors to The Dow Chemical Company, Midland, Mich.
No Drawing. Filed Mar. 25, 1969, Ser. No. 810,355
Int. Cl. C07d 23/02, 23/04
U.S. Cl. 260—239 E
6 Claims

ABSTRACT OF THE DISCLOSURE

In the process for making an aziridine, e.g. aziridine, by reacting ammonia with a vicinal dihaloalkane, e.g. 1,2-dichloroethane, in the presence of an alkali metal hydroxide acid acceptor, e.g. sodium hydroxide, the improvement comprising adding either intermittently or continuously, the alkali metal hydroxide throughout the reaction period or a portion thereof in an amount sufficient to substantially neutralize any hydrogen halide formed during the reaction but insufficient to cause substantial dehydrohalogenation of the vicinal dihaloalkane results in increased yields of aziridines.

BACKGROUND OF THE INVENTION

It is known to produce aziridines by reacting ammonia with a vicinal dihaloalkane in the presence of an alkali metal hydroxide acid acceptor. See Miller et al., U.S. Pat. No. 3,336,294. This patent does not specifically disclose the incremental addition of the alkali metal hydroxide to the reaction vessel during the reaction.

SUMMARY OF THE INVENTION

In the process for making an aziridine by reacting ammonia with a vicinal dihaloalkane in the presence of an alkali metal hydroxide acid acceptor and separating the thus formed aziridine from the reaction mixture, the present improvement comprises continuously or intermittently adding the alkali metal hydroxide to the reaction mixture during the reaction period or a portion thereof in an amount sufficient to substantially neutralize any hydrogen halide formed during the reaction but insufficient to cause substantial dehydrohalogenation of the vicinal dihaloalkane results in higher yields of the aziridine.

In order to practice the invention, a vicinal dihaloalkane or equivalent is reacted by contact, in any convenient manner, with ammonia while in the presence of an alkali metal hydroxide that is added incrementally, either intermittently or continuously, to the reaction mixture throughout the reaction or a portion thereof and the aziridine thus formed is separated from the reaction mixture.

Typical aziridines that are formed by this process include those having the formula

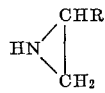

where R is H, methyl or ethyl; e.g. aziridine, 2-methylaziridine or 2-ethylaziridine.

Typical vicinal dihaloalkanes useful in this invention include those having the formula

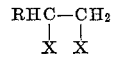

where R is H, methyl or ethyl and each X independently is halogen, e.g. 1,2-dichloroethane, 1,2-dichloropropane, 1,2-dichlorobutane, 1,2-dibromoethane, 1,2-dibromopropane, 1,2-dibromobutane, 1,2-diiodoethane, 1,2-diiodopropane, 1,2-diiodobutane, 1,2-difluoroethane, 1,2-difluoropropane, 1,2-difluorobutane, 1-bromo-2-chloroethane, 1-bromo-2-chloropropane, 1-chloro-2-bromopropane, 1-bromo-2-chlorobutane, 1-chloro-2-bromobutane, and the like.

The ammonia used in this invention can be anhydrous ammonia or aqueous ammonia, e.g. an aqueous solution containing from about 25 to about 100 percent ammonia, by weight.

The alkali metal hydroxides useful in this invention include lithium hydroxide, sodium hydroxide and potassium hydroxide. It is preferred to use an aqueous solution of the alkali metal hydroxides, e.g. an aqueous solution containing from about 5 to about 60 percent alkali metal hydroxide, by weight. Instead of an aqueous solution of the alkali metal hydroxides or in conjunction therewith, one can use polar solvents, e.g. alcohols such as methanol, ethanol or ethylene glycol and the like, to dissolve the alkali metal hydroxide.

The alkali metal hydroxide is added incrementally, either intermittently or continuously, to the reaction mixture, in any convenient manner, throughout the reaction period or a substantial portion thereof, the amount of alkali metal hydroxide present within the reaction mixture at any one time being sufficient to neutralize at least a substantial portion of any hydrogen halide formed during the reaction, e.g. HCl, but insufficient to cause substantial dehydrohalogenation of the vicinal dihaloalkane. In general, the molar ratio of the total amount of alkali metal hydroxide added to the reaction mixture to vicinal dihaloalkane is between 0.1/1 and 1.1/1; preferably between 0.9/1 and 1/1. Excess does no harm if added after the reaction is essentially complete but is harmful in the presence of substantial alkylene halide.

The process of the invention is carried out under a wide range of conditions, depending upon the particular reactants involved. In general, it is preferred to use a temperature between 20 and 200° C., and preferably one between 35 and 80° C. The reaction time will also vary depending upon the temperature employed, but generally the reaction is complete in a matter of hours, e.g. 3–8 hours. It is preferred to use superatmospheric presure; autogenous pressure will suffice, preferably a pressure between 150–300 p.s.i.g. Higher pressures may be desirable, however, as is taught in Pat. 3,326,895. Generally, the molar ratio of ammonia to vicinal dihaloalkane is between 5/1 and 100/1, and preferably between about 20/1 and 40/1.

The general process for aziridine production is disclosed in U.S. Pat. No. 3,336,294, the disclosure of which is hereby incorporated by reference. The reactants and conditions disclosed there are suitable for the present invention.

DESCRIPTION OF SPECIFIC EMBODIMENT

Example 1 shows the poor yields obtained when alkali metal hydroxide is precharged to the reaction vessel instead of added incrementally as in the other examples.

Example 1

A pressure reactor was charged with a 4 m. of ethylene chloride, 80 m. of ammonia, 8.8 m. of anhydrous KOH and 60 g. of toluene. It was heated to 100° C. for 38 min., after which it was cooled, opened and the contents analyzed. The conversion of ethylene chloride was 100% and the yield of aziridine was 11.4%. The presence of vinyl chloride indicated extensive dehydrochlorination of the ethylene chloride.

Example 2

A four liter stainless steel cylindrical reactor having an inlet line was charged with 1050 g. (ca. 62 moles) of ammonia and 200 g. (ca. 2 moles) of 1,2-dichloroethane. The reactor was heated to 55° C. and maintained there. After 90 minutes had passed, an aqueous solution of 30% sodium hydroxide was fed into the reactor at a rate of 1.5 ml. per minute and continued at this rate for 3¾ hours. At this time, the rate was increased to 2 ml. per minute and the sodium hydroxide solution was fed until a total of 418 ml. (ca. 4.2 moles) had been fed to the reactor.

After the 418 ml. solution had been added, the reactor was cooled and the products analyzed to show that 100% of the 1,2-dichloroethane was converted to give a yield of aziridine of 60%, based on 1,2-dichloroethane.

Example 3

A one liter stainless steel pressure vessel having an inlet line was charged with 450 g. NH₃ and 80 g. of 1,2-dichloroethane. The reaction mixture was heated and maintained at 60° C. for 2 hours.

After this time, a 30% aqueous solution of NaOH was fed into the vessel for one hour at a rate of 3.3 ml./min. After NaOH addition, the reaction temperature was raised to 65° C. and 100 ml. more of NaOH were added to the vessel at a rate of 3.3 ml./min.

After NaOH addition, the reactor was cooled and the products analyzed to show that 100% of the 1,2-dichloroethane was converted to give a yield of aziridine of 60%, based on 1,2-dichloroethane.

Example 4

In a continuous run, using four reactors in series, 68.6 parts/hour of ammonia and 13.2 parts/hour of 1,2-dichloroethane (both by weight) were fed into the first reactor. The pressure in each reactor was autogenous and the temperature in each was as follows: first, 42° C., second, 47° C., third, 48° C. and fourth, 45° C. The total holding time was 11.57 hours.

No sodium hydroxide was fed into the first reactor, but to the second, third and fourth reactors respectively was fed 19, 6.4 and 4.2 parts/hour (by weight of a 30% aqueous solution of NaOH.

Total conversion of 1,2-dichloroethane was 94.9% and the yield of aziridine was 65.6%, based on 1,2-dichloroethane.

We claim:
1. In the process for making an aziridine by reacting ammonia with a vicinal dihaloalkane in the presence of an alkali metal hydroxide acid acceptor, the improvement which comprises incrementally adding the alkali metal hydroxide to the reaction mixture during the reaction period in an amount sufficient to substantially neutralize the hydrogen halide formed during the reaction but insufficient to cause substantial dehydrohalogenation of the vicinal dihaloalkane.
2. A process as defined in claim 1 or wherein the alkali metal hydroxide is added continuously during the reaction period.
3. A process as defined in claim 1 wherein the alkali metal hydroxide is sodium hydroxide.
4. A process as defined in claim 1 wherein the aziridine has the formula

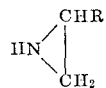

and the vicinal dihaloalkane has the formula

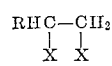

where R is H, methyl or ethyl and each X independently is chlorine or bromine.
5. A process as defined in claim 4 wherein each X is chlorine.
6. A process as defined in claim 5 wherein each R is H, and the alkali metal hydroxide is sodium hydroxide.

References Cited

UNITED STATES PATENTS 3,336,294  8/1967  Miller et al. _____ 260—239

FOREIGN PATENTS 649,353  9/1962  Canada _____ 260—239

ALTON D. ROLLINS, Primary Examiner